US005954816A

United States Patent [19]

Tran et al.

[11] Patent Number: 5,954,816

[45] **Date of Patent: *Sep. 21, 1999**

[54] BRANCH SELECTOR PREDICTION

[75] Inventors: Thang M. Tran, Austin; David E. Kroesche, Pflugerville; Karthikeyan Muthusamy; Andrew McBride, both of Austin, all of Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,988

[22] Filed: Nov. 19, 1997

Related U.S. Application Data

[63] Continuation-in-part of application No. 08/752,691, Nov. 19, 1996.

[51] Int. Cl.[6] .......... G06F 9/38

[52] U.S. Cl. .......... 712/239; 712/233

[58] Field of Search .......... 395/586, 580; 712/239, 233

[56] References Cited

U.S. PATENT DOCUMENTS

| | | | |
|---|---|---|---|
| 4,044,338 | 8/1977 | Wolf | 365/49 |
| 4,179,737 | 12/1979 | Kim . | |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,860,197 | 8/1989 | Langendorf et al. . | |

(List continued on next page.)

FOREIGN PATENT DOCUMENTS

| | | |
|---|---|---|
| 0 199 947 A2 | 11/1986 | European Pat. Off. . |
| 0259095 | 3/1988 | European Pat. Off. . |
| 0381471 | 8/1990 | European Pat. Off. . |

(List continued on next page.)

OTHER PUBLICATIONS

Young, et al, "An Intelligent I–Cache Prefetch Mechanism," IBM Research Division, Almaden Research Center, San Jose, Ca, published in Proceedings of the International Conference on Computer Design: VLSI In Computers and Processors, Cambridge Ma., Oct. 3–6, 1993, pp. 44–49.

(List continued on next page.)

*Primary Examiner*—Krisna Lim
*Attorney, Agent, or Firm*—Conley, Rose & Tayon; Lawrence J. Merkel; B. Noel Kivlin

[57] ABSTRACT

A branch prediction unit includes a branch prediction entry corresponding to a group of contiguous instruction bytes. The branch prediction entry stores branch predictions corresponding to branch instructions within the group of contiguous instruction bytes. Additionally, the branch prediction entry stores a set of branch selectors corresponding to the group of contiguous instruction bytes. The branch selectors identify which branch prediction is to be selected if the corresponding byte (or bytes) is selected by the offset portion of the fetch address. Still further, a predicted branch selector is stored. The predicted branch selector is used to select a branch prediction for forming the fetch address. In parallel, a selected branch selector is selected from the set of branch selectors. The predicted branch selector is verified using the selected branch selector. If the selected branch selector and the predicted branch selector mismatch, the correct branch prediction is generated and the predicted branch selector is updated to indicate the selected branch selector.

22 Claims, 10 Drawing Sheets from Instruction Cache 16
106
from Reorder Buffer
124
118
Fetch Address
Update Bus
116
from Functional Units and Decode Units
$P_{00}$ $P_{01}$ $P_{10}$ $P_{11}$ $P_{20}$ $P_{21}$ $P_{30}$ $P_{31}$
Update Logic 102
DEC 104
from Prefetch/ Predecode Unit
120
108
from Instruction Cache 16
Way
90
92
SEQ
Ret. Stk.
BP1
BP2
112
110
96
94
98
122
Branch Prediction Unit 14
126
100
Branch Prediction
114
Branch Tag
to Instruction Cache 16

U.S. PATENT DOCUMENTS

| | | | |
|---|---|---|---|
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/586 |
| 5,142,634 | 8/1992 | Fite et al. . | |
| 5,226,126 | 7/1993 | McFarland et al. | 395/394 |
| 5,226,130 | 7/1993 | Favor et al. | 395/586 |
| 5,235,697 | 8/1993 | Steely, Jr. et al. | 711/137 |
| 5,381,533 | 1/1995 | Peleg et al. . | |
| 5,418,922 | 5/1995 | Liu | 711/128 |
| 5,454,117 | 9/1995 | Puziol et al. . | |
| 5,553,254 | 9/1996 | Bertis et al. . | |
| 5,592,634 | 1/1997 | Circello et al. | 395/586 |
| 5,649,137 | 7/1997 | Favor et al. . | |
| 5,649,178 | 7/1997 | Blaner et al. . | |
| 5,708,803 | 1/1998 | Ishimi et al. . | |
| 5,737,590 | 4/1998 | Hara | 395/585 |
| 5,758,142 | 5/1998 | McFarling et al. | 395/586 |
| 5,764,946 | 6/1998 | Tran et al. | 395/586 |

FOREIGN PATENT DOCUMENTS

| | | |
|---|---|---|
| 0 394 711 A2 | 10/1990 | European Pat. Off. . |
| 0459232 | 12/1991 | European Pat. Off. . |
| 0 586 057 A2 | 3/1994 | European Pat. Off. . |
| 0 605 876 A1 | 7/1994 | European Pat. Off. . |
| 2263985 | 8/1993 | United Kingdom . |
| 2263987 | 8/1993 | United Kingdom . |
| 2281422 | 3/1995 | United Kingdom . |
| 2 285 526 | 7/1995 | United Kingdom . |
| WO 93/17385 | 9/1993 | WIPO . |

OTHER PUBLICATIONS

Calder, et al, "Next Cache Line and Set Prediction," Department of computer Science, University of Colorado, Boulder, Co, 8345 Architecture News, May 23, (1995), No. 2, New York, pp. 287–296.

International Search Report for PCT 97/21048 dated Mar. 30, 1998.

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

U.S. Application Serial No. 08/752,691.
U.S. Application Serial No. 08/481,914.
U.S. Application Serial No. 08/472,249.
U.S. Application Serial No. 08/819,109.
U.S. Application Serial No. 08/472,665.
U.S. Application Serial No. 08/550,296.
U.S. Application Serial No. 08/570,242.
U.S. Application Serial No. 08/713,287.
U.S. Application Serial No. 08/731,765.
U.S. Application Serial No. 08/752,691.
U.S. Application Serial No. 08/713,499.

| Byte Position | 0 | 1 | 2-3 | 4-5 | 6-7 | 8-9 | A-B | C-D | E-F |
|---|---|---|---|---|---|---|---|---|---|
| Branch Selector Position | 0 | 1 | 2 | 3 | 4 | 5 | 6 | 7 | 8 |
| Read Addresses | 0000 | 0001 | 001x | 010x | 011x | 100x | 101x | 110x | 111x |
| Encoding Addresses | 0000 | 0001<br>0010 | 0011<br>0100 | 0101<br>0110 | 0111<br>1000 | 1001<br>1010 | 1011<br>1100 | 1101<br>1110 | 1111 |

Branch Selector Encoding

| Encoding (Binary) | Branch Prediction |
| --- | --- |
| 00 | Sequential |
| 01 | Return Stack |
| 10 | Branch Prediction 1 |
| 11 | Branch Prediction 2 |

138

BRANCH SELECTOR PREDICTION

CROSS REFERENCE TO RELATED APPLICATIONS

This application is a continuation in part of application Ser. No. 08/752,691 filed Nov. 19, 1996.

BACKGROUND OF THE INVENTION

1. Field of the Invention

This invention relates to the field of microprocessors and, more particularly, to branch prediction mechanisms within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. Unconditional branch instructions always branch to the target address, while conditional branch instructions may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. For example, a cache-line based branch prediction scheme may be employed in which branch predictions are stored corresponding to a particular cache line of instruction bytes in an instruction cache. A cache line is a number of contiguous bytes which are treated as a unit for allocation and deallocation of storage space within a cache. When the instruction cache line is fetched, the corresponding branch predictions are also fetched. Furthermore, when the particular cache line is discarded, the corresponding branch predictions are discarded as well. The cache line is aligned in memory. A cache-line based branch prediction scheme may be made more accurate by storing a larger number of branch predictions for each cache line. A given cache line may include multiple branch instructions, each of which is represented by a different branch prediction. Therefore, more branch predictions allocated to a cache line allows for more branch instructions to be represented and predicted by the branch prediction mechanism. A branch instruction which cannot be represented within the branch prediction mechanism is not predicted, and subsequently a "misprediction" may be detected if the branch is found to be taken. However, complexity of the branch prediction mechanism is increased by the need to select between additional branch predictions. As used herein, a "branch prediction" is a value which may be interpreted by the branch prediction mechanism as a prediction of whether or not a branch instruction is taken or not taken. Furthermore, a branch prediction may include the target address. For cache-line based branch prediction mechanisms, a prediction of a sequential line to the cache line being fetched is a branch prediction when no branch instructions are within the instructions being fetched from the cache line.

A problem related to increasing the complexity of the branch prediction mechanism is that the increased complexity generally requires an increased amount of time to form the branch prediction. For example, selecting among multiple branch predictions may require a substantial amount of time. The offset of the fetch address identifies the first byte being fetched within the cache line: a branch prediction for a branch instruction prior to the offset should not be selected. The offset of the fetch address within the cache line may need to be compared to the offset of the branch instructions represented by the branch predictions stored for the cache line in order to determine which branch prediction to use. The branch prediction corresponding to a branch instruction subsequent to the fetch address offset and nearer to the fetch address offset than other branch instructions which are subsequent to the fetch address offset should be selected. As the number of branch predictions is increased, the complexity (and time required) for the selection logic increases. When the amount of time needed to form a branch prediction for a fetch address exceeds the clock cycle time of the microprocessor, performance of the microprocessor may be decreased. Because the branch prediction cannot be formed in a single clock cycle, "bubbles" are introduced into the instruction processing pipeline during clock cycles that instructions cannot be fetched due to a lack of a branch prediction corresponding to a previous fetch address. The bubble occupies various stages in the instruction processing pipeline during subsequent clock cycles, and no work occurs at the stage including the bubble because no instructions are included in the bubble. Performance of the microprocessor may thereby be decreased.

SUMMARY OF THE INVENTION

The problems outlined above are in large part solved by a branch prediction unit in accordance with the present invention. The branch prediction unit includes a branch prediction entry corresponding to a group of contiguous instruction bytes. The branch prediction entry stores branch predictions corresponding to branch instructions within the group of contiguous instruction bytes. Additionally, the branch prediction entry stores a set of branch selectors corresponding to the group of contiguous instruction bytes. The branch selectors identify which branch prediction is to be selected if the corresponding byte (or bytes) is selected by the offset portion of the fetch address. Still further, a predicted branch selector is stored. The predicted branch selector is used to select a branch prediction for forming the fetch address. Advantageously, the selection of one of the set of branch selectors is removed from the branch prediction selection. Branch prediction selection may be performed more rapidly than achievable if branch selectors were selected prior to selecting the branch prediction. The branch prediction unit may be operable at a higher frequency, which may allow its use in higher frequency microprocessors than other branch prediction units.

In parallel, a selected branch selector is selected from the set of branch selectors. The predicted branch selector is verified using the selected branch selector. If the selected branch selector and the predicted branch selector mismatch, the correct branch prediction is generated and the predicted branch selector is updated to indicate the selected branch selector. Advantageously, the accuracy of the branch prediction mechanism may be maintained with a minor penalty (e.g. a clock cycle) when the predicted branch selector is incorrect.

Broadly speaking, the present invention contemplates a branch prediction unit comprising a branch prediction storage and a selection device. The branch prediction storage is coupled to receive a fetch address, and is configured to select a predicted branch selector stored therein in response to the fetch address. The selection device is configured to select a subsequent fetch address from at least two selectable addresses responsive to the predicted branch selector.

The present invention further contemplates a method for generating a subsequent fetch address from a fetch address in a microprocessor. A predicted branch selector is read from a branch prediction storage responsive to the fetch address. The subsequent fetch address is predicted responsive to the predicted branch selector. Subsequently, the predicted branch selector is verified as corresponding to the fetch address.

Moreover, the present invention contemplates a microprocessor comprising an instruction cache and a branch prediction unit. The instruction cache is configured to select a group of contiguous instruction bytes stored therein responsive to a fetch address. Coupled to receive the fetch address, the branch prediction unit is configured to select a predicted branch selector responsive to the fetch address. Additionally, the branch prediction unit is configured to generate a subsequent fetch address response to the predicted branch selector. Furthermore, the branch prediction unit is configured to verify the predicted branch selector by selecting one of a plurality of branch selectors corresponding to the fetch address and comparing the one of the plurality of branch selectors to the predicted branch selector.

BRIEF DESCRIPTION OF THE DRAWINGS

Other objects and advantages of the invention will become apparent upon reading the following detailed description and upon reference to the accompanying drawings in which:

FIG. 5 is a table illustrating byte positions, branch selectors, read addresses, and encoding addresses according to the branch selectors shown in FIG. 4.

Figure 1:
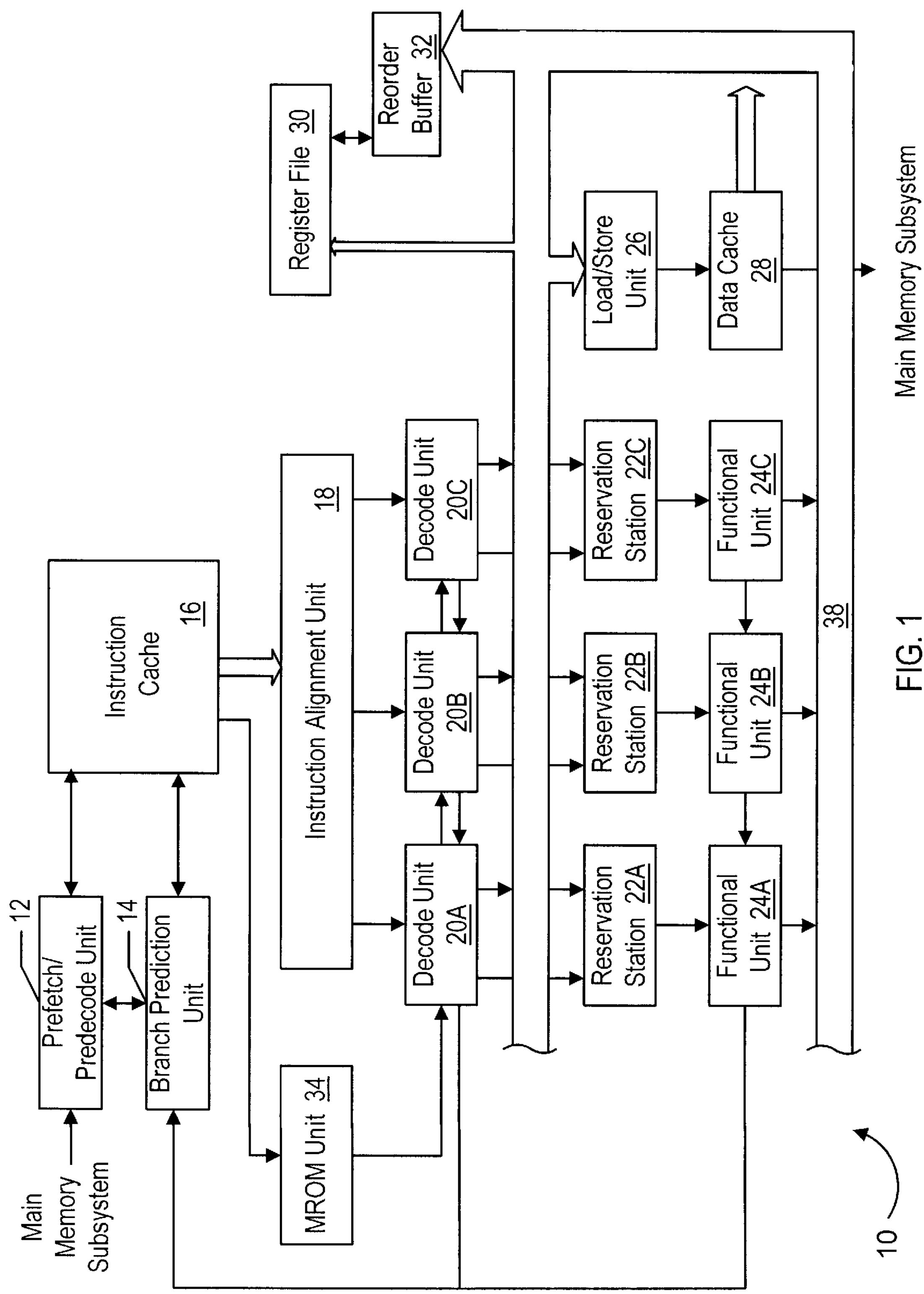
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, branch prediction unit 14 employs a cache-line based branch prediction mechanism for predicting branch instructions. Multiple branch predictions may be stored for each cache line. Additionally, a set of branch selectors are stored for each cache line. The branch selector for a particular byte indicates which of the branch predictions which may be stored with respect to the cache line is the branch prediction appropriate for an instruction fetch address which fetches that byte. The appropriate branch prediction is the branch prediction for the first predicted-taken branch instruction encountered within the cache line subsequent to the particular byte. As used herein, the terms "subsequent" and "prior to" refer to an ordering of bytes within the cache line. A byte stored at a memory address which is numerically smaller than the memory address at which a second byte is stored is prior to the second byte. Conversely, a byte stored at a memory address which is numerically larger than the memory address of a second byte is subsequent to the second byte. Similarly, a first instruction is prior to a second instruction in program order if the first instruction is encountered before the second instruction when stepping one at a time through the sequence of instructions forming the program. As used herein, an "instruction fetch address" or "fetch address" is an address generated by microprocessor 10 in order to fetch instructions for execution.

In order to further increase the speed of branch prediction selection, branch prediction unit 14 stores a predicted branch selector. The predicted branch selector comprises one of the branch selectors stored for the cache line. More particularly, the predicted branch selector is used directly to select the branch prediction for use in forming the subsequent fetch address. In parallel, one of the plurality of branch selectors is selected by decoding the offset portion of the fetch address. The predicted branch selector and the selected one of the plurality of branch selectors are compared to verify the predicted branch selector. Advantageously, the logic for selecting a branch selector is removed from the path for generating a subsequent fetch address. The predicted branch selector may be set to, for example, the branch selector selected during a previous fetch of the cache line.

In one embodiment, the cache line is divided into multiple byte ranges and a branch selector is stored for each byte range within the cache line (as opposed to storing a branch selector for each byte). As used herein, a byte range is one or more contiguous bytes within a cache line (or portion thereof, if less than a full cache line is provided at the output of instruction cache 16 as described below). By storing a branch selector per byte range instead of a branch selector per byte, the number of branch selectors stored may advantageously be reduced. Reducing the number of branch selectors stored (and hence the size of the storage) may lead to a more rapid access, as well as cost savings realized by reducing the substrate area occupied by microprocessor 10.

In one embodiment, microprocessor 10 employs a microprocessor architecture in which the instruction set is a variable byte length instruction set (e.g. the x86 microprocessor architecture). When a variable byte length instruction set is employed, any byte within the cache line may be identified as the first byte to be fetched by a given fetch address. For example, a branch instruction may have a target address at byte position two within a cache line. In such a case, the bytes at byte positions zero and one are not being fetched during the current cache access. Additionally, bytes subsequent to a predicted-taken branch which is subsequent to the first fetched byte are not fetched during the current cache access. The branch prediction for the predicted taken branch can be located by selecting the branch selector corresponding to the byte range including the first byte to be fetched from the cache line. The branch selector is used to select the appropriate branch prediction, which is then provided to the instruction fetch logic in instruction cache 16. During the succeeding clock cycle, the branch prediction is used as the fetch address. Advantageously, the process of comparing the byte position of the first byte being fetched to the byte positions of the predicted-taken branch instructions is eliminated from the generation of a branch prediction in response to a fetch address. The amount of time required to form a branch prediction may be reduced accordingly, allowing the branch prediction mechanism to operate at higher clock frequencies (i.e. shorter clock cycles) while still providing a single cycle branch prediction.

It is noted that, although the term "cache line" has been used in the preceding discussion, some embodiments of instruction cache 16 may not provide an entire cache line at its output during a given clock cycle. For example, in one embodiment instruction cache 16 is configured with 32 byte cache lines. However, only 16 bytes are fetched in a given clock cycle (either the upper half or the lower half of the cache line). The branch prediction storage locations and branch selectors are allocated to the portion of the cache line being fetched. As used herein, the term "group of contiguous instruction bytes" is used to refer to the instruction bytes which are provided by the instruction cache in a particular clock cycle in response to a fetch address. A group of contiguous instruction bytes may be a portion of a cache line or an entire cache line, according to various embodiments. When a group of contiguous instruction bytes is a portion of a cache line, it is still an aligned portion of a cache line. For example, if a group of contiguous instruction bytes is half a cache line, it is either the upper half of the cache line or the lower half of the cache line. A number of branch prediction storage locations are allocated to each group of contiguous instruction bytes, and branch selectors indicate one of the branch prediction storage locations associated with that group. Furthermore, branch selectors may indicate a return stack address from a return stack structure or a sequential address if no branch instructions are encountered between the corresponding byte and the last byte in the group of contiguous instruction bytes.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
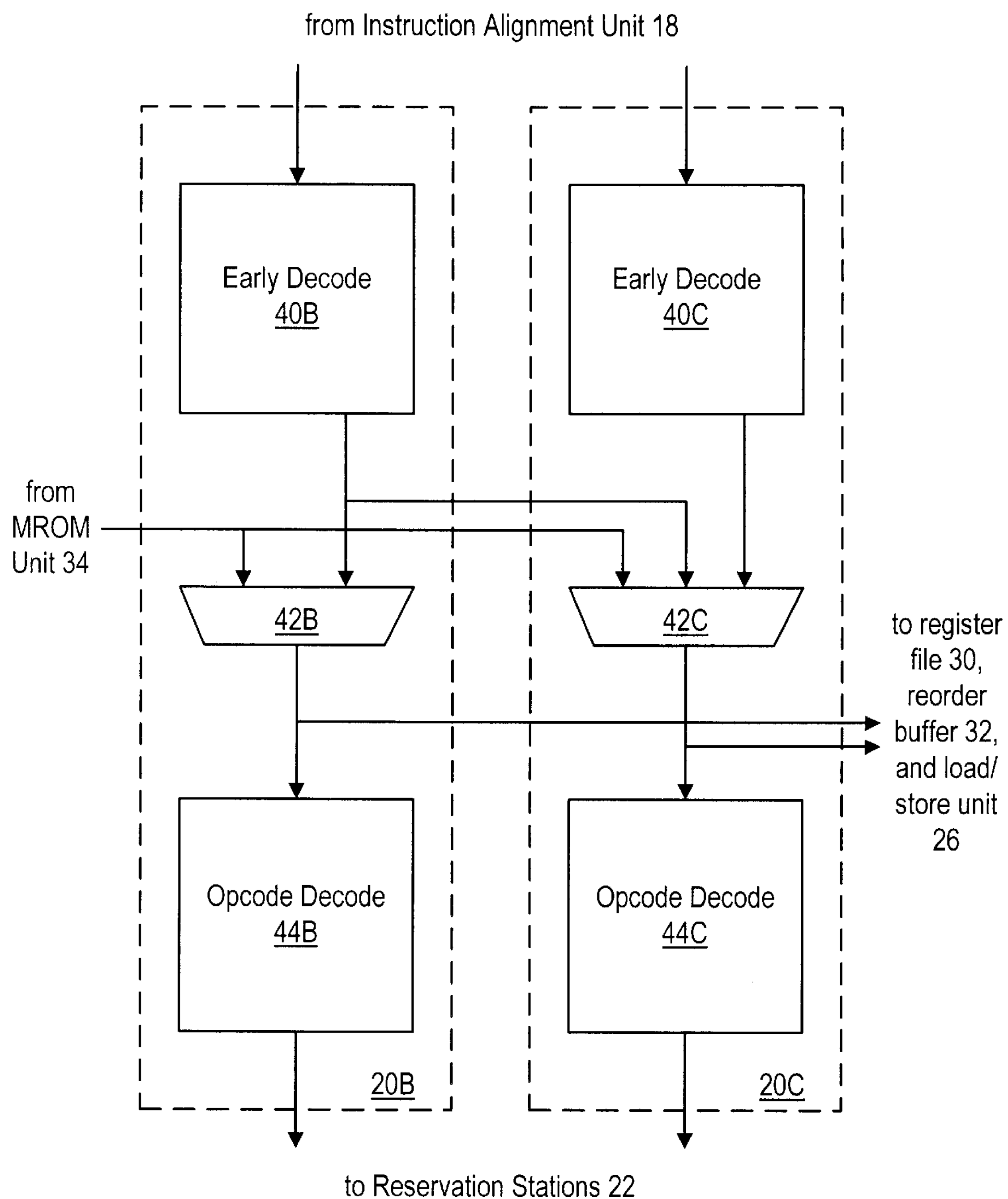
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown)

detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
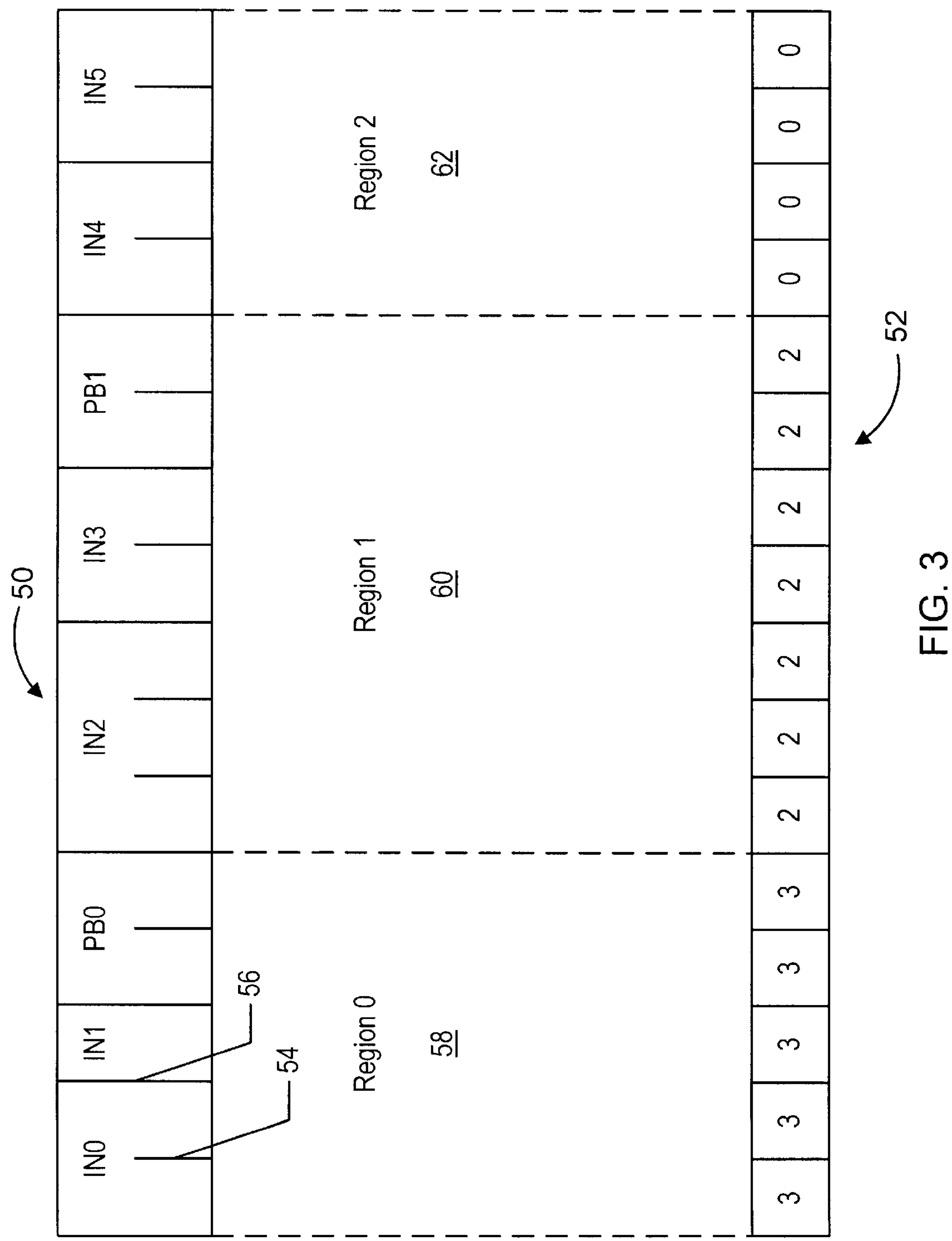
FIG. 3 is a diagram illustrating a group of contiguous instruction bytes and a corresponding set of branch selectors according to one embodiment of branch selectors.

Turning now to FIG. 3, a diagram of an exemplary group of contiguous instruction bytes 50 and a corresponding set of branch selectors 52 are shown. In FIG. 3, each byte within an instruction is illustrated by a short vertical line (e.g. reference number 54). Additionally, the vertical lines separating instructions in group 50 delimit bytes (e.g. reference number 56). The instructions shown in FIG. 3 are variable in length, and therefore the instruction set including the instructions shown in FIG. 3 is a variable byte length instruction set. In other words, a first instruction within the variable byte length instruction set may occupy a first number of bytes which is different than a second number of bytes occupied by a second instruction within the instruction set. Other instruction sets may be fixed-length, such that each instruction within the instruction set occupies the same number of bytes as each other instruction.

As illustrated in FIG. 3, group 50 includes non-branch instructions IN0–IN5. Instructions IN0, IN3, IN4, and IN5 are two byte instructions. Instruction IN1 is a one byte instruction and instruction IN2 is a three byte instruction. Two predicted-taken branch instructions PB0 and PB1 are illustrated as well, each shown as occupying two bytes. It is noted that both non-branch and branch instructions may occupy various numbers of bytes.

The end byte of each predicted-taken branch PB0 and PB1 provides a division of group 50 into three regions: a first region 58, a second region 60, and a third region 62. If a fetch address identifying group 50 is presented, and the offset of the fetch address within the group identifies a byte position within first region 58, then the first predicted-taken branch instruction to be encountered is PB0 and therefore the branch prediction for PB0 is selected by the branch prediction mechanism. Similarly, if the offset of the fetch address identifies a byte within second region 60, the appropriate branch prediction is the branch prediction for PB1. Finally, if the offset of the fetch address identifies a byte within third region 62, then there is no predicted-taken branch instruction within the group of instruction bytes and subsequent to the identified byte. Therefore, the branch prediction for third region 62 is sequential. The sequential address identifies the group of instruction bytes which immediately follows group 50 within main memory.

As used herein, the offset of an address comprises a number of least significant bits of the address. The number is sufficient to provide different encodings of the bits for each byte within the group of bytes to which the offset relates. For example, group 50 is 16 bytes. Therefore, four least significant bits of an address within the group form the offset of the address. The remaining bits of the address identify group 50 from other groups of contiguous instruction bytes within the main memory. Additionally, a number of least significant bits of the remaining bits form an index used by instruction cache 16 to select a row of storage locations which are eligible for storing group 50.

Set 52 is an exemplary set of branch selectors for group 50. One branch selector is included for each byte within group 50. The branch selectors within set 52 use the encoding shown in FIG. 8 below. In the example, the branch prediction for PB0 is stored as the second of two branch predictions associated with group 50 (as indicated by a branch selector value of "3"). Therefore, the branch selector for each byte within first region 58 is set to "3". Similarly, the branch prediction for PBI is stored as the first of the branch predictions (as indicated by a branch selector value of "2"). Therefore, the branch selector for each byte within second region 60 is set to "2". Finally, the sequential branch prediction is indicated by the branch selectors for bytes within third region 62 by a branch selector encoding of "0".

It is noted that, due to the variable byte length nature of the x86 instruction set, a branch instruction may begin within one group of contiguous instruction bytes and end within a second group of contiguous instruction bytes. In such a case, the branch prediction for the branch instruction is stored with the second group of contiguous instruction bytes. Among other things, the bytes of the branch instruction which are stored within the second group of contiguous instruction bytes need to be fetched and dispatched. Forming the branch prediction in the first group of contiguous instruction bytes would cause the bytes of the branch instruction which lie within the second group of instruction bytes not to be fetched.

Employing a set of branch selectors such as set 52 allows for a rapid determination of the predicted fetch address (i.e. by decoding the offset portion of the fetch address and selecting the corresponding selector from set 52). However, a large number of branch selectors are stored (i.e. one for each byte). The amount of branch prediction storage employed for storing the branch selectors would correspondingly be large. Still further, a relatively wide selection device (such as a mux) would be needed to select the branch selector in response to the offset of the fetch address. The wider the selection device, in general, the greater the delay in propagating the selected value through the selection device (e.g. the selected branch selector).

FIG. 3 illustrates that the branch selector for each byte within a region is the same, and regions are delimited by branch instructions (more particularly, predicted-taken branch instructions). Branch instructions would generally include at least an opcode (identifying the branch instruction within the instruction set employed by microprocessor 10) and a displacement to be added to the address of the branch instruction (or the address of the instruction immediately following the branch instruction) to form the branch target address. Therefore, a branch instruction occupies at least two bytes. By taking advantage of this fact, the number of branch selectors stored with respect to a group of contiguous instruction bytes may be reduced.

For the remainder of this description, the x86 microprocessor architecture will be used as an example. However, the branch selector technique described herein may be employed within any microprocessor architecture, and such embodiments are contemplated. It is noted that, in the x86 microprocessor architecture, a subroutine return instruction is defined (e.g. the RET instruction). The subroutine return instruction specifies that its branch target address is drawn from the top of the stack indicated by the ESP register. Therefore, the RET instruction is a single byte (i.e. an opcode byte).

Figure 4:
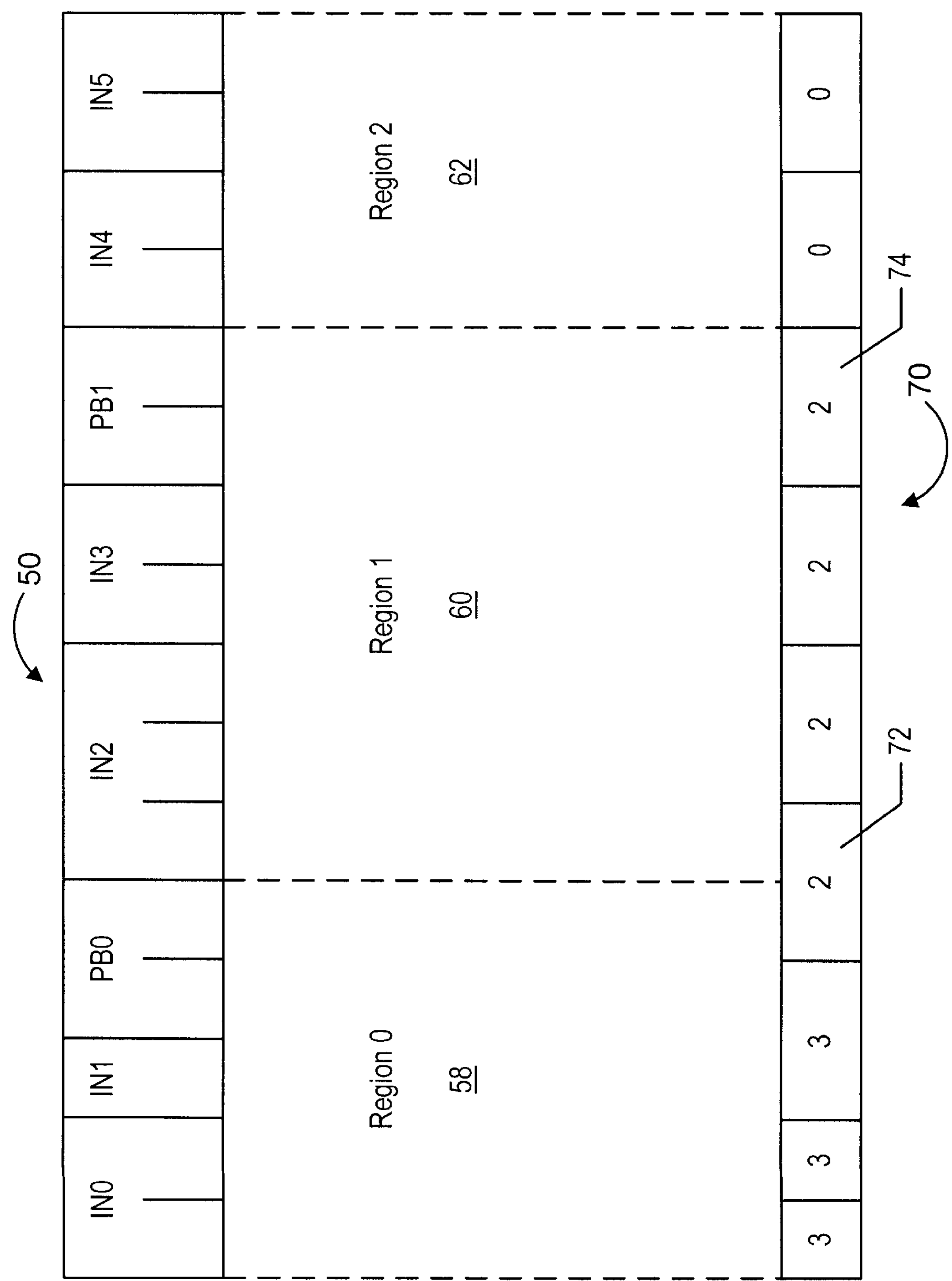
FIG. 4 is a diagram illustrating a group of contiguous instruction bytes and a corresponding set of branch selectors according to another embodiment of branch selectors.

Turning next to FIG. 4, a diagram illustrating group 50, regions 58, 60, and 62, and one embodiment of a set of branch selectors 70 is illustrated. The branch selectors within set 70 correspond to byte ranges defined within group 50. For the example shown in FIG. 4, nine branch selectors are used for a group of 16 contiguous instruction bytes. Set 70 therefore occupies less storage within a branch prediction storage than set 52 shown in FIG. 3 occupies, allowing the branch prediction storage to be made smaller. Still further, a narrower selection device may be used to select a branch selector in response to a fetch address. The selected branch selector may be provided more rapidly, and may thereby provide for a higher frequency implementation in which predicted fetch addresses are provided each clock cycle.

Generally, the largest byte range defined for a given branch selector may be made equal to the shortest branch instruction (excluding the return instruction as described in more detail below). The majority of the byte ranges are selected to be the largest size. However, to handle certain conditions, the embodiment shown in FIG. 4 employs two byte ranges which are smaller than the maximum size. In particular, the initial byte of the group 50 forms a byte range having a single byte. Since group 50 is an even number of bytes, the byte range corresponding to the initial byte includes only the initial byte, and the largest byte range is two bytes in this example, another byte range is defined to have a single byte as well. For set 70, the byte within group 50 which is contiguous to the initial byte is selected to be a single byte range. This selection allows for a relatively simple decode of the offset of the fetch address to select a branch selector, as illustrated in FIG. 5.

Since the byte ranges are selected to be no larger than the shortest branch instruction, a branch instruction may begin in one byte range and end in a subsequent byte range. However, at most one branch instruction ends in a particular byte range, even if branch instructions are consecutive within a particular group of contiguous instruction bytes. For the case of a branch instruction which ends within a particular byte range but not at the end of the byte range, the branch selector for that byte range is selected to be the branch selector corresponding to instruction bytes subsequent to the branch instruction. For example, the branch selector for byte range 72 (which includes bytes 3–4, where the initial byte is numbered byte 0) indicates the branch prediction corresponding to predicted branch PB1. The above rule is used because a fetch address within the byte range is not fetching the branch instruction (which begins in the preceding byte range). Therefore, the correct branch prediction is the prediction for the subsequent branch.

On the other hand, if the branch instruction ends at the last byte within the byte range, the branch selector for the byte range is the branch selector corresponding to the branch instruction (e.g. byte range 74). Therefore, if a fetch address specifying predicted branch PB1 (i.e. the offset is within byte range 74), then the branch prediction used for the fetch is the branch prediction corresponding to branch PB1.

Turning now to FIG. 5, a table 76 is shown corresponding to the selection of byte ranges for branch selectors as illustrated in the example of FIG. 4. The row of table 76 labeled "Byte Position" lists the byte positions within group 50 which correspond to each byte range (i.e. the offset portion of the address for each byte which is within each byte range). The row labeled "Branch Selector Position" illustrates the branch selector position within the set 70 of the branch selector corresponding to each byte range. The row labeled "Read Addresses" lists the fetch address offsets (in binary) which are decoded to select the branch selector within the corresponding byte range (in order to form a predicted fetch address for the subsequent clock cycle). An "x" in the read addresses indicates a don't care position. Finally, the row labeled "Encoding Addresses" lists the fetch address offsets (in binary) at which a branch instruction can end and still have the branch selector for that byte range indicate the branch prediction corresponding to that branch instruction. For example, branch selector position 2 can indicate the branch prediction for a branch instruction which ends at either byte position 3 or 4. More particularly, a branch instruction which ends at byte position 2 is not represented by the branch selector in branch selector position 2 (because the branch instruction begins in a different byte range than that associated with branch selector position 2, and is therefore not being fetched if the fetch address offset is within the byte range associated with branch selector position 2).

The "Read Addresses" row of table 76 illustrates that a relatively simple decoding of the fetch address offset can be used to select the appropriate branch selector for that fetch address. The decoding for branch selector positions 0 and 1 include each of the fetch address offset bits, but the decoding for the remaining positions may exclude the least significant bit (since it is a don't care). A rapid decode and branch selector selection may be achieved using the allocation of byte ranges illustrated in FIG. 4.

Figure 6:
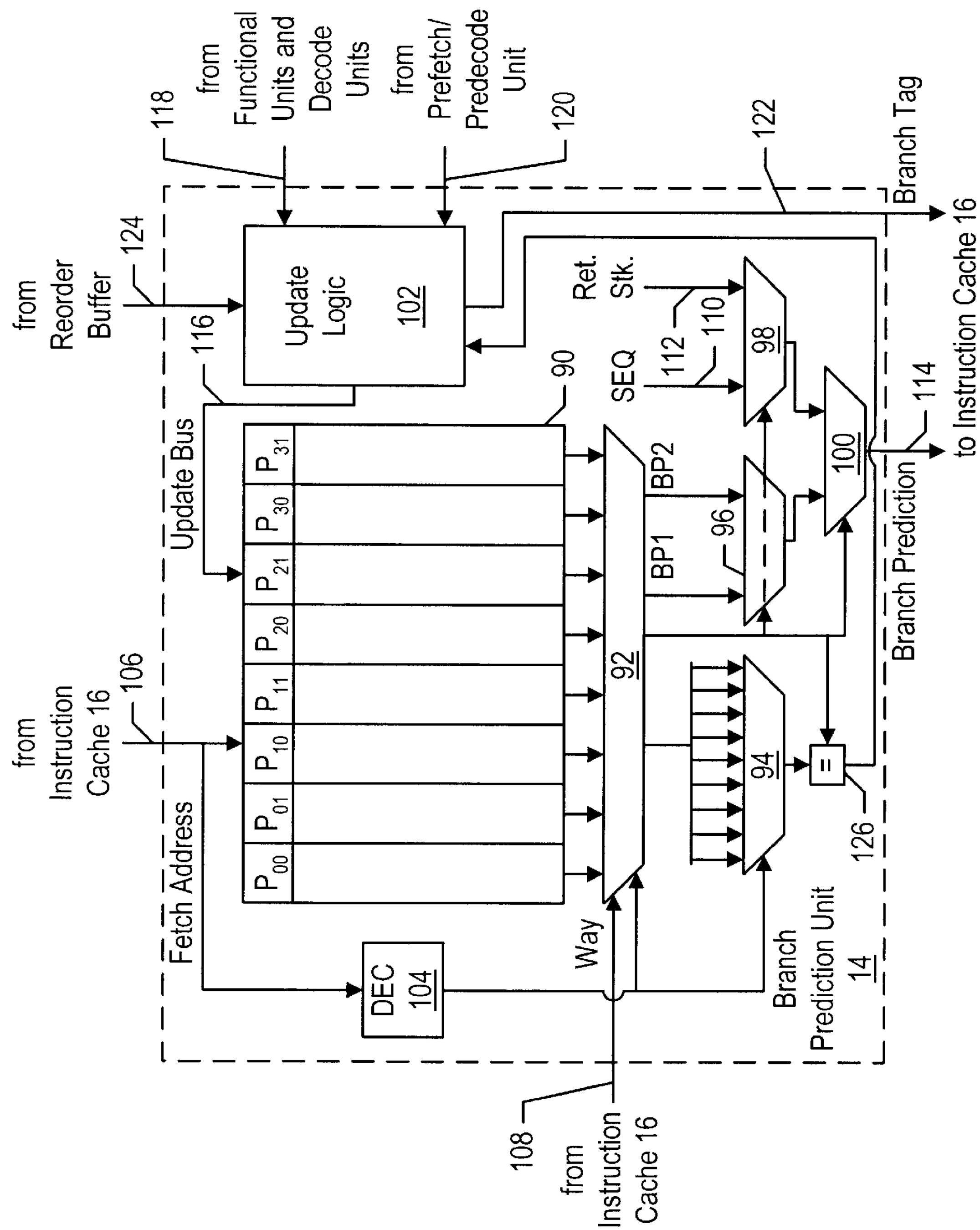
FIG. 6 is a block diagram of one embodiment of a branch prediction unit shown in FIG. 1.

Turning now to FIG. 6, a portion of one embodiment of branch prediction unit 14 is shown. Other embodiments of branch prediction unit 14 and the portion shown in FIG. 6 are contemplated. As shown in FIG. 6, branch prediction unit 14 includes a branch prediction storage 90, a way multiplexor 92, a branch selector multiplexor 94, a branch prediction multiplexor 96, a sequential/return multiplexor 98, a final prediction multiplexor 100, an update logic block 102, and a decoder 104. Branch prediction storage 90 and decoder 104 are coupled to a fetch address bus 106 from instruction cache 16. A fetch address concurrently provided to instruction cache 16 is conveyed upon fetch address bus 106. Decoder block 104 provides selection controls to branch selector multiplexor 94. Prediction controls for way multiplexor 92 are provided via a way selection bus 108 from instruction cache 16. Way selection bus 108 provides the way of instruction cache 16 which is storing the cache line corresponding to the fetch address provided on fetch address bus 106. Additionally, a selection control is provided by decoder 104 based upon which portion of the cache line is being fetched. Way multiplexor 92 is coupled to receive the contents of each storage location within the row of branch prediction storage 90 which is indexed by the fetch address upon fetch address bus 106. Branch selector multiplexor 94 and branch prediction multiplexor 96 are coupled to receive portions of the output of way multiplexor 92 as inputs. Additionally, a portion of the output of way multiplexor 92 provides selection controls for multiplexors 96, 98, and 100. Sequential/return multiplexor 98 selects between a sequential address provided upon a sequential address bus 110 from instruction cache 16 and a return address provided upon a return address bus 112 from a return stack. The output of multiplexors 96 and 98 is provided to final prediction multiplexor 100, which provides a branch prediction bus 114 to instruction cache 16. Instruction cache 16 uses the branch prediction provided upon branch prediction bus 114 as the fetch address for the subsequent clock cycle. Update logic block 102 is coupled to branch prediction storage 90 via an update bus 116 used to update branch prediction information stored therein. Update logic block 102 provides updates in response to a misprediction signalled via a mispredict bus 118 from functional units 24 and decode units 20. Additionally, update logic block 102 provides updates in response to newly predecoded instruction indicated by prefetch/predecode unit 12 upon a predecode bus 120.

In the present embodiment, branch prediction storage 90 is arranged with a number of ways equal to the number of ways in instruction cache 16. For each way, a branch prediction entry is stored for each group of contiguous instruction bytes existing within a cache line. In the embodiment of FIG. 6, two groups of instruction bytes are included in each cache line. Therefore, branch prediction entry $P_{00}$ is the branch prediction entry corresponding to the first group of contiguous instruction bytes in the first way and branch prediction entry $P_{01}$ is the branch prediction entry corresponding to the second group of contiguous instruction bytes in the first way. Similarly, branch prediction entry $P_{10}$ is the branch prediction entry corresponding to the first group of contiguous instruction bytes in the second way and branch prediction entry $P_{11}$ is the branch prediction entry corresponding to the second group of contiguous instruction bytes in the second way, etc. Each branch prediction entry $P_{00}$ to $P_{31}$ in the indexed row is provided as an output of branch prediction storage 90, and hence as an input to way multiplexor 92. The indexed row is similar to indexing into a cache: a number of bits which are not part of the offset portion of the fetch address are used to select one of the rows of branch prediction storage 90. It is noted that branch prediction storage 90 may be configured with fewer rows than instruction cache 16. For example, branch prediction storage 90 may include ¼ the number of rows of instruction cache 16. In such a case, the address bits which are index bits of instruction cache 16 but which are not index bits of branch prediction storage 90 may be stored with the branch prediction information and checked against the corresponding bits of the fetch address to confirm that the branch prediction information is associated with the row of instruction cache 16 which is being accessed.

Way multiplexor 92 selects one of the sets of branch prediction information $P_{00}$–$P_{31}$ based upon the way selection provided from instruction cache 16 and the group of instruction bytes referenced by the fetch address. In the embodiment shown, for example, a 32 byte cache line is divided into two 16 byte groups. Therefore, the fifth least significant bit of the fetch address is used to select which of the two groups contains the fetch address. If the fifth least significant bit is zero, then the first group of contiguous instruction bytes is selected. If the fifth least significant bit is one, then the second group of contiguous instruction bytes is selected. It is noted that the way selection provided upon way selection bus 108 may be a way prediction produced by a branch prediction from the previous clock cycle, according to one embodiment. Alternatively, the way selection may be generated via tag comparisons between the fetch address and the address tags identifying the cache lines stored in each way of the instruction cache. It is noted that an address tag is the portion of the address which is not an offset within the cache line nor an index into the instruction cache.

The selected branch prediction entry provided by way multiplexor 92 includes a set of branch selectors corresponding to the group of contiguous instruction bytes, a predicted branch selector, and branch predictions BP1 and BP2. The branch selectors are provided to branch selector multiplexor 94, which selects one of the branch selectors based upon selection controls provided by decoder 104. Decoder 104 decodes the offset of the fetch address into the group of contiguous instruction bytes to select the corresponding branch selector (for example, according to the "read address" row of table 76, in one embodiment or according to the particular byte, in another embodiment). For example, if a group of contiguous instruction bytes is 16 bytes, then decoder 104 decodes the four least significant bits of the fetch address. In this manner, a branch selector is chosen.

The predicted branch selector is used to provide selection controls to branch prediction multiplexor 96, sequential/return multiplexor 98, and final prediction multiplexor 100. In one embodiment, the encoding of the branch selector can be used directly as the multiplexor select controls. In other embodiments, a logic block may be inserted to decode the predicted branch selector and to control multiplexors 96, 98, and 100. For the embodiment shown, branch selectors comprise two bits. One bit of the predicted branch selector provides the selection control for prediction multiplexor 96 and sequential/return multiplexor 98. The other bit provides a selection control for final prediction multiplexor 100. A branch prediction is thereby selected from the multiple branch predictions stored in branch prediction storage 90 corresponding to the group of contiguous instruction bytes being fetched, the sequential address of the group of contiguous instruction bytes sequential to the group of contiguous instruction bytes being fetched, and a return stack address from a return stack structure. It is noted that multiplexors 96, 98, and 100 may be combined into a single 4 to 1 multiplexor for which the predicted branch selector provides selection controls to select between the two branch predictions from branch prediction storage 90, the sequential address, and the return address.

The return stack structure (not shown) is used to store return addresses corresponding to subroutine call instructions previously fetched by microprocessor 10. In one embodiment, the branch predictions stored by branch prediction storage 90 include an indication that the branch prediction corresponds to a subroutine call instruction. Subroutine call instructions are a subset of branch instructions which save the address of the sequential instruction (the return address) in addition to redirecting the instruction stream to the target address of the subroutine call instruction. For example, the in the x86 microprocessor architecture, the subroutine call instruction (CALL) pushes the return address onto the stack indicated by the ESP register.

A subroutine return instruction is another subset of the branch instructions. The subroutine return instruction uses the return address saved by the most recently executed subroutine call instruction as a target address. Therefore, when a branch prediction includes an indication that the branch prediction corresponds to a subroutine call instruction, the sequential address to the subroutine call instruction is placed at the top of the return stack. When a subroutine return instruction is encountered (as indicted by a particular branch selector encoding), the address nearest the top of the return stack which has not previously been used as a prediction is used as the prediction of the address. The address nearest the top of the return stack which has not previously been used as a prediction is conveyed by the return stack upon return address bus 112 (along with the predicted way of the return address, provided to the return stack similar to its provision upon way selection bus 108. Branch prediction unit 14 informs the return stack when the return address is selected as the prediction. Additional details regarding an exemplary return stack structure may be found in the commonly assigned, co-pending patent application entitled: "Speculative Return Address Prediction Unit for a Superscalar Microprocessor", Ser. No. 08/550,296, filed Oct. 30, 1995 by Mahalingaiah, et al. The disclosure of the referenced patent application is incorporated herein by reference in its entirety.

The sequential address is provided by instruction cache 16. The sequential address identifies the next group of contiguous instruction bytes within main memory to the group of instruction bytes indicated by the fetch address upon fetch address bus 106. It is noted that, according to one embodiment, a way prediction is supplied for the sequential address when the sequential address is selected. The way prediction may be selected to be the same as the way selected for the fetch address. Alternatively, a way prediction for the sequential address may be stored within branch prediction storage 90.

In addition to selecting a branch prediction, the predicted branch selector is provided to a comparator 126. The selected branch selector from branch selector multiplexor 94 is also provided to comparator 126. The output of comparator 126 is provided to update unit 102, and acts as a verification that the predicted branch selector corresponds to the selected branch selector selected in accordance with the offset of the fetch address. The predicted branch selector is set to the most recently selected branch selector, and therefore may differ from the branch selector corresponding to the current fetch address. It is noted that the verification of the predicted branch selector may be pipelined to a subsequent clock cycle from the clock cycle in which the selectors are read from branch prediction storage 90. In such an embodiment, storage devices (not shown) may be inserted at an appropriate point to store the intermediate values for continued operation in the subsequent clock cycle. However, it is noted that the present structure may advantageously be employed even if the verification can be completed in the same clock cycle. The delay in generating the branch prediction on branch prediction bus 114 may still be decreased using the predicted branch selector, and the time saved may be put to other uses.

If comparator 126 detects inequality between the predicted branch selector and the selected branch selector, update logic 102 cancels the current fetch (corresponding to the fetch address upon fetch address bus 106) because the current fetch address (generated from a branch prediction selected by the predicted branch selector) is incorrect. Update logic 102 updates the predicted branch selector within the branch prediction entry within branch prediction storage 90 from which the prediction was fetched with the selected branch selector, and uses the selected branch prediction to generate a corrected fetch address. It is noted that update logic 102 may store the fetched branch prediction entry to allow for fetch address correction without reaccessing branch prediction storage 90.

Figures 7, 8:
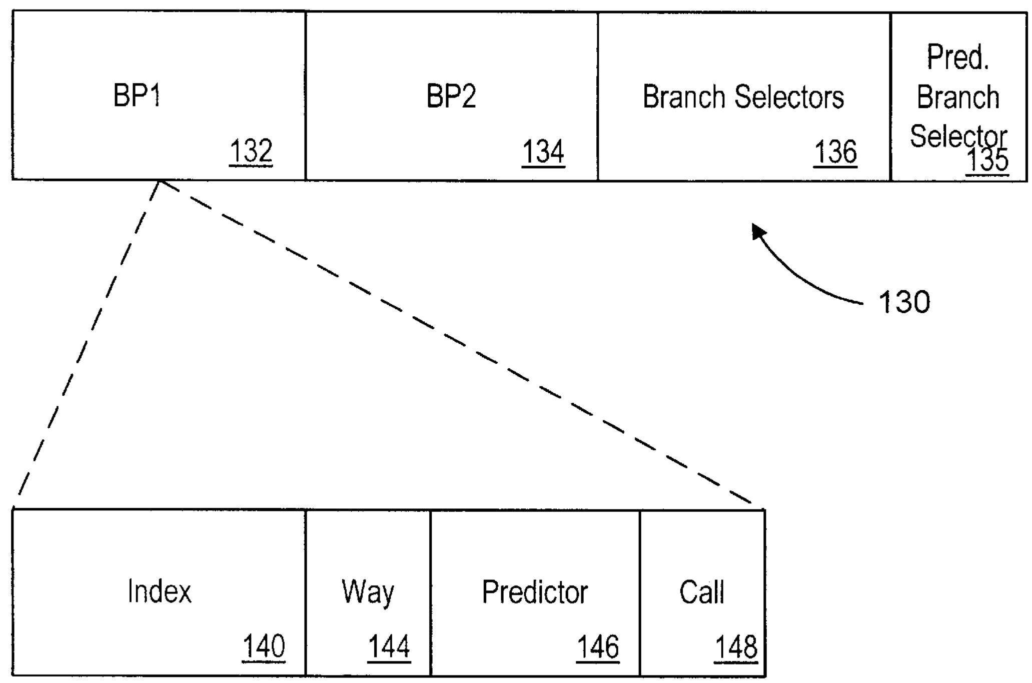
FIG. 7 is a diagram illustrating one embodiment of a branch prediction entry which may be employed by the branch prediction unit shown in FIG. 6.
FIG. 8 is a table illustrating an encoding of a branch selector according to one embodiment of branch selectors.

As mentioned above, update logic block 102 is configured to update a branch prediction entry upon detection of a branch misprediction or upon detection of a branch instruction while predecoding the corresponding group of contiguous instruction bytes in prefetch/predecode unit 12. The branch prediction entry corresponding to each branch prediction may be stored in update logic block 102 as the prediction is performed. A branch tag is conveyed along with the instructions being fetched (via a branch tag bus 122), such that if a misprediction is detected or a branch instruction is detected during predecoding, the corresponding branch prediction entry can be identified via the branch tag. In one embodiment, the branch prediction entry as shown in FIG. 7 is stored, as well as the index of the fetch address which caused the branch prediction entry to be fetched and the way in which the branch prediction entry is stored.

When a branch misprediction is detected, the corresponding branch tag is provided upon mispredict bus 118 from either the functional unit 24 which executes the branch instruction or from decode units 20. If decode units 20 provide the branch tag, then the misprediction is of the previously undetected type (e.g. there are more branch instructions in the group than can be predicted using the corresponding branch predictions). Decode units 20 detect mispredictions of unconditional branch instructions (i.e. branch instructions which always select the target address). Functional units 24 may detect a misprediction due to a previously undetected conditional branch instruction or due to an incorrect taken/not-taken prediction. Update logic 102 selects the corresponding branch prediction entry out of the aforementioned storage. In the case of a previously undetected branch instruction, one of the branch predictions within the branch prediction entry is assigned to the previously undetected branch instruction. According to one embodiment, the algorithm for selecting one of the branch predictions to store the branch prediction for the previously undetected branch instruction is as follows: If the branch instruction is a subroutine return instruction, the branch selector for the instruction is selected to be the value indicating the return stack. Otherwise, a branch prediction which is currently predicted not-taken is selected. If each branch prediction is currently predicted-taken, then a branch prediction is randomly selected.

The branch selector for the newly detected branch instruction is set to indicate the selected branch prediction. Additionally, the branch selectors corresponding to byte ranges between the first branch instruction prior to the newly detected branch instruction and the newly detected branch instruction are set to the branch selector corresponding to the new prediction. For a mispredicted taken prediction which causes the prediction to become predicted not-taken, the branch selectors corresponding to the mispredicted prediction are set to the branch selector corresponding to the byte subsequent to the mispredicted branch instruction. In this manner, a prediction for a subsequent branch instruction will be used if the instructions are fetched again at a later clock cycle. Additionally, the predicted branch selector is set to the branch selector being updated (i.e. the branch selector indicating the newly detected branch instruction or the branch selector updated into the previously predicted branch instruction in the case that a branch instruction becomes predicted not-taken).

When prefetch/predecode unit 12 detects a branch instruction while predecoding a group of contiguous instruction bytes, prefetch/predecode unit 12 provides the branch tag for the group of contiguous instruction bytes if the predecoding is performed because invalid predecode information is stored in the instruction cache for the cache line (case (i)). Alternatively, if the predecoding is being performed upon a cache line being fetched from the main memory subsystem, prefetch/predecode unit 12 provides the address of the group of contiguous instruction bytes being predecoded, the offset of the end byte of the branch instruction within the group, and the way of the instruction cache selected to store the group (case (ii)). In case (i), the update is performed similar to the branch misprediction case above. In case (ii), there is not yet a valid branch prediction entry stored in branch prediction storage 90 for the group of instructions. For this case, update logic block 102 initializes the branch selectors prior to the detected branch to the branch selector selected for the detected branch. Furthermore, the branch selectors subsequent to the detected branch are initialized to the sequential value. Alternatively, each of the branch selectors may be initialized to sequential when the corresponding cache line in instruction cache 16 is allocated, and subsequently updated via detection of a branch instructions during predecode in a manner similar to case (i).

Upon generation of an update, update logic block 102 conveys the updated branch prediction entry, along with the fetch address index and corresponding way, upon update bus 116 for storage in branch prediction storage 90. It is noted that, in order to maintain branch prediction storage 90 as a single ported storage, branch prediction storage 90 may employ a branch holding register. The updated prediction information is stored into the branch holding register and updated into the branch prediction storage upon an idle cycle on fetch address bus 106. An exemplary cache holding register structure is described in the commonly assigned, co-pending patent application entitled: "Delayed Update Register for an Array", Ser. No. 08/481,914, filed Jun. 7, 1995, by Tran, et al., incorporated herein by reference in its entirety.

It is noted that a correctly predicted branch instruction may result in an update to the corresponding branch prediction as well. A counter indicative of previous executions of the branch instruction (used to form the taken/not-taken prediction of the branch instruction) may need to be incremented or decremented, for example. Such updates may be performed upon retirement of the corresponding branch prediction. Retirement is indicated via a branch tag upon retire tag bus 124 from reorder buffer 32.

Turning now to FIG. 7, an exemplary branch prediction entry 130 employed by one embodiment of the branch prediction unit 14 as shown in FIG. 6 is shown. Branch prediction entry 130 includes a set of branch selectors 136, a first branch prediction (BP1) 132, a second branch prediction (BP2) 134, and a predicted branch selector 135. Set of branch selectors 136 includes a branch selector for each byte (or byte range, depending upon the embodiment) of the group of contiguous instruction bytes corresponding to branch prediction entry 130. Predicted branch selector 135 stores the most recently selected branch selector, and is used to select a branch prediction when entry 130 is fetched.

First branch prediction 132 is shown in an exploded view in FIG. 7. Second branch prediction 134 may be configured similarly. First branch prediction 132 includes an index 140 for the cache line containing instruction bytes corresponding to the target address, and a way selection 144 for the cache line as well. According to one embodiment, index 140 includes the offset portion of the target address, as well as the index. Index 140 is concatenated with the tag of the way indicated by way selection 144 to form the branch target address. Alternatively, the entire branch target address may be stored in index field 140. Way prediction may be provided in addition to the entire branch target address, or way selection may be performed using tag comparisons against the tags in the indexed row of instruction cache 16.

Additionally, a predictor 146 is stored for each branch prediction. Predictor 146 is incremented each time the corresponding branch instruction is executed and is taken, and is decremented each time the corresponding branch instruction is executed and is not-taken. The most significant bit of predictor 146 is used as the taken/not-taken prediction. If the most significant bit is set, the branch instruction is predicted taken. Conversely, the branch instruction is predicted not-taken if the most significant bit is clear. In one embodiment, the prediction counter is a two bit saturating counter. The counter saturates when incremented at binary '11'and saturates when decremented at a binary '01'. In another embodiment, the predictor is a single bit which indicates a strong (a binary one) or a weak (a binary zero) taken prediction. If a strong taken prediction is mispredicted, it becomes a weak taken prediction. If a weak taken prediction is mispredicted, the branch becomes predicted not taken and the branch selector is updated (i.e. the case of a mispredicted branch that becomes not-taken). Finally, a call bit 148 is included in first branch prediction 132. Call bit 148 is indicative, when set, that the corresponding branch instruction is a subroutine call instruction. If call bit 148 is set, the current fetch address and way are stored into the return stack structure mentioned above.

Turning next to FIG. 8, a table 138 illustrating an exemplary branch selector encoding is shown. A binary encoding is listed (most significant bit first), followed by the branch prediction which is selected when the branch selector is encoded with the corresponding value. As table 138 illustrates, the least significant bit of the branch selector can be used as a selection control for branch prediction multiplexor 96 and sequential/return multiplexor 98. If the least significant bit is clear, then the first branch prediction is selected by branch prediction multiplexor 96 and the sequential address is selected by sequential/return multiplexor 98. On the other hand, the second branch prediction is selected by branch prediction multiplexor 96 and the return address is selected by sequential/return multiplexor 98 if the least significant bit is clear. Furthermore, the most significant bit of the branch selector can be used as a selection control for final prediction multiplexor 100. If the most significant bit is set, the output of branch prediction multiplexor 96 is selected. If the most significant bit is clear, the output of sequential/return multiplexor 98 is selected.

Figure 9:
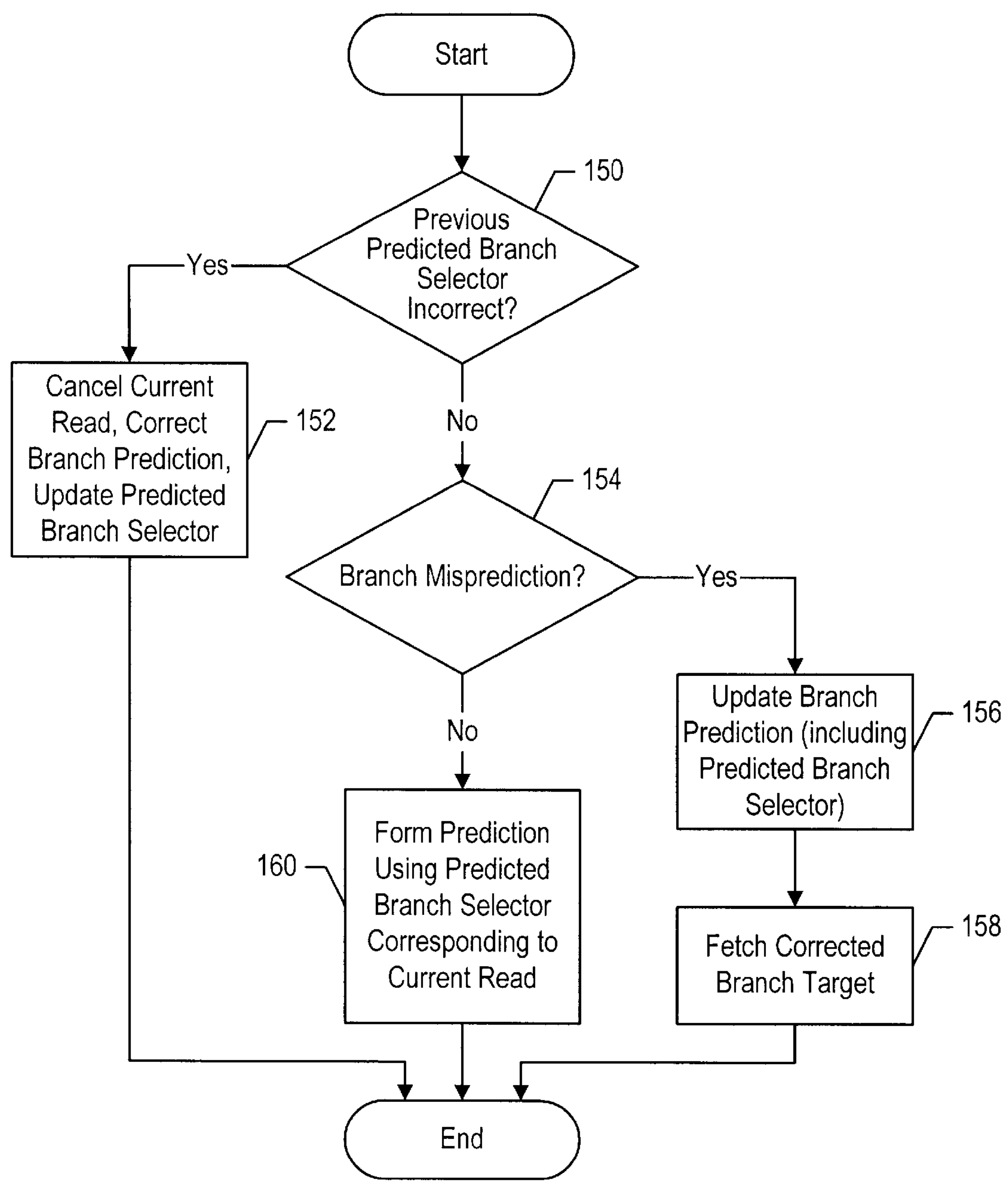
FIG. 9 is a flowchart illustrating operation of one embodiment of the branch prediction unit shown in FIG. 6.

Turning next to FIG. 9, a flowchart illustrating operation of one embodiment of branch prediction unit 14 is shown. The steps shown in the flowchart of FIG. 9 may be evaluated each clock cycle by branch prediction unit 14. It is noted that, although the steps shown in FIG. 9 are shown serially for ease of understanding, the steps may be performed in any suitable order and may be performed in parallel by combinatorial logic within branch prediction unit 14.

Branch prediction unit 14 determines if the previously predicted branch selector is incorrect (decision block 150). In other words, branch prediction unit 14 determines if the predicted branch selector matches the selected branch selector provided in response to the offset portion of the fetch address. If the predicted branch selector is incorrect, then branch prediction unit 14 performs recovery operations (step 152). The current read address (formed using the incorrect predicted branch selector) is cancelled. Additionally, the branch prediction address (i.e. the fetch address) is corrected to indicate the branch prediction corresponding to the selected branch selector. Furthermore, the predicted branch selector for the corresponding entry is updated to indicate the selected branch selector.

On the other hand, if the previously predicted branch selector is correct, then branch prediction unit 14 determines if a misprediction is being signalled by decode units 20 or functional units 24 (decision block 154). If a misprediction is being signalled, then branch prediction unit 14 updates the branch prediction entry which generated the misprediction (step 156). Included in updating the branch prediction entry is updating the predicted branch selector to indicate the corrected branch prediction (which may be a sequential prediction or one of the branch predictions which is allocated to the mispredicted branch, for example). Additionally, the corrected branch target corresponding to the misprediction is fetched (step 158). If no misprediction is signalled, branch prediction unit 14 forms a branch prediction in response to the current fetch address, using the predicted branch selector (step 160).

Figure 10:
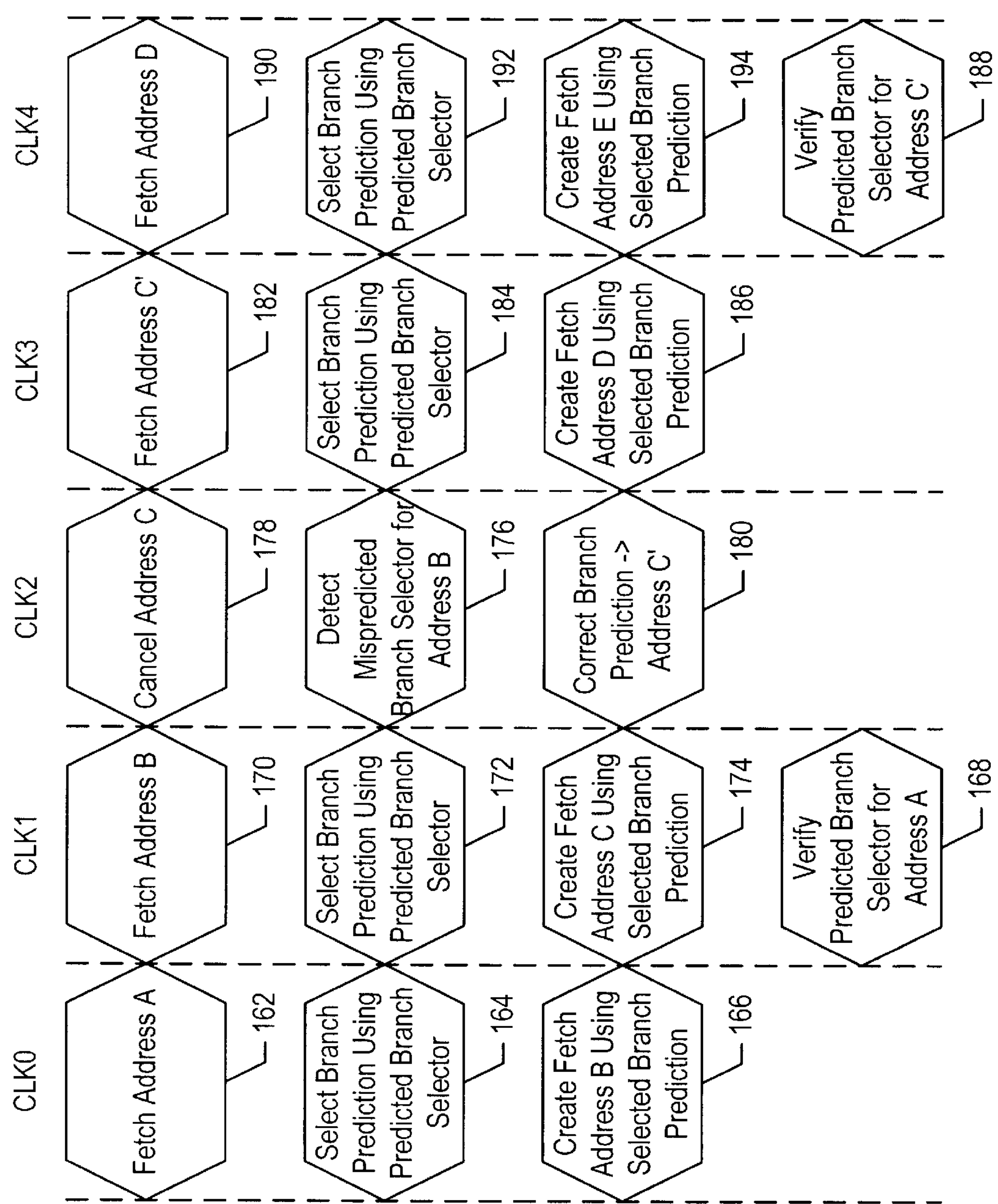
FIG. 10 is a timing diagram illustrating operation of one embodiment of the branch prediction unit shown in FIG. 6.

Turning now to FIG. 10, a timing diagram illustrating operation of one embodiment of branch prediction unit 14 is shown. Clock cycles are shown in FIG. 10 delimited by vertical dashed lines. The clock cycles are labeled CLK0, CLK1, etc. During clock cycle CLK0, a fetch address A is presented to branch prediction unit 14 (and concurrently to instruction cache 16—reference numeral 162). Branch prediction unit 14 selects a branch prediction using the predicted branch selector (reference numeral 164) and creates a fetch address B using the selected branch prediction (reference numeral 166). During clock cycle CLK1, the predicted branch selector corresponding to fetch address A (i.e. the branch selector used to generate fetch address B) is verified to be correct (reference numeral 168). Concurrently, fetch address B is presented (reference numeral 170).

Similar to clock cycle CLK0, a predicted branch selector corresponding to fetch address B is used to select a branch prediction and a fetch address C is created using the selected branch prediction during clock cycle CLK1 (reference numerals 172 and 174). However, during clock cycle CLK2, branch prediction unit 14 detects that the predicted branch selector is mispredicted (reference numeral 176). In other words, the selected branch selector corresponding to fetch address B does not match the predicted branch selector. Therefore, fetch address C is cancelled and the correct branch prediction (according to the selected branch selector) is used to generate fetch address C' (reference numerals 178 and 180).

During clock cycle CLK3, fetch address C' is provided (reference numeral 182). A corresponding predicted branch selector is read from branch prediction storage 90 and a fetch address D is created therefrom (reference numerals 184 and 186). During clock cycle CLK4, the predicted branch selector corresponding to fetch address C' is verified as matching the selected branch selector corresponding to fetch address C' (reference numeral 188). Concurrently, fetch address D is presented and a corresponding predicted branch selector is used to generate a fetch address E (reference numerals 190, 192, and 194).

Figure 11:
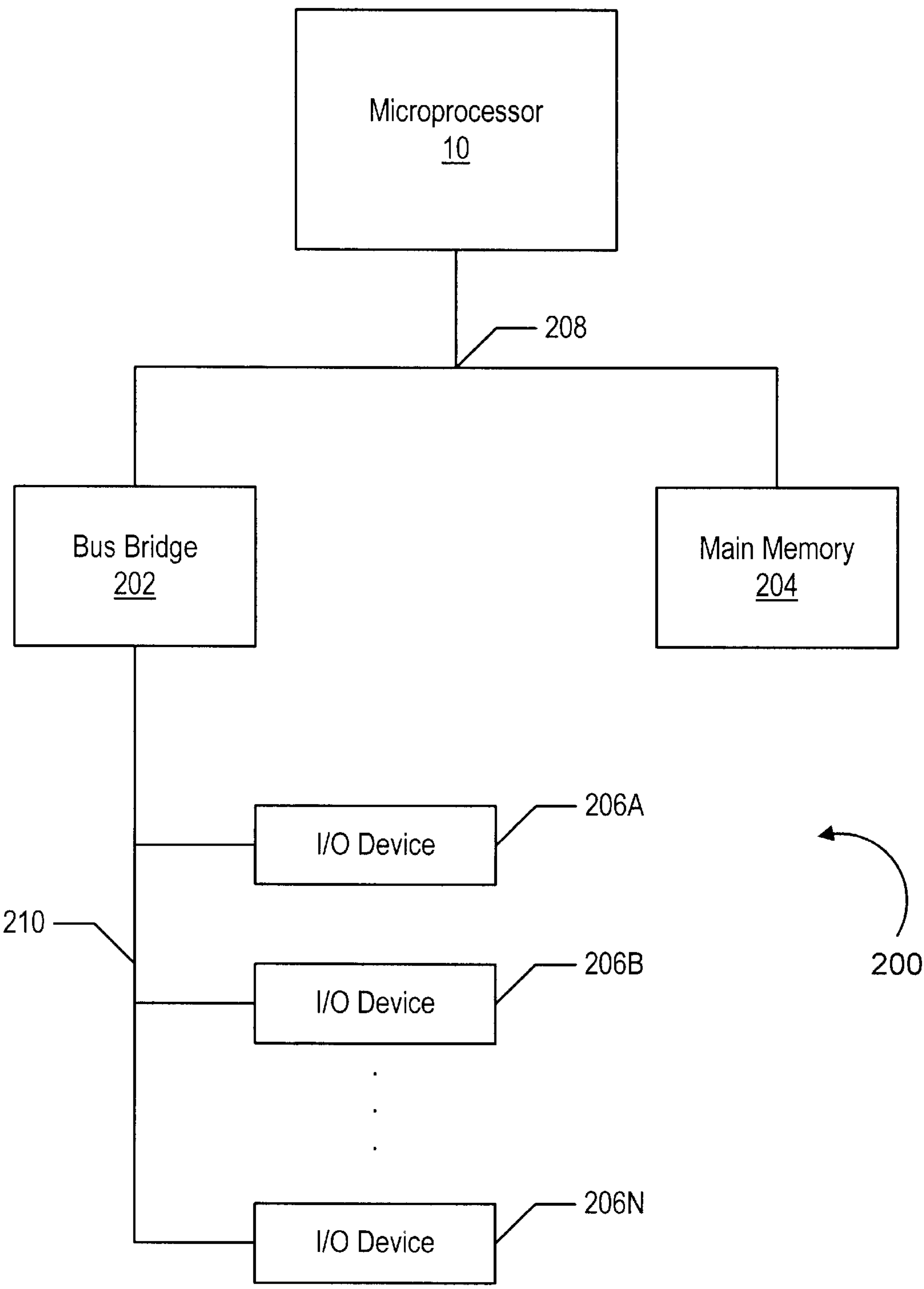
FIG. 11 is a block diagram of one embodiment of a computer system including the microprocessor shown in FIG. 1.

Turning now to FIG. 11, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 11 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG, | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |

TABLE 1-continued x86 Fast Path, Double Dispatch, and MROM Instructions

| X86 Instruction | Instruction Category |
|---|---|
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

In accordance with the above disclosure, a branch prediction unit has been shown which stores a set of branch selectors corresponding to a group of contiguous instruction bytes within an instruction cache. The set of branch selectors identify, for each byte within the group of contiguous instruction bytes, which branch prediction should be used to form a subsequent fetch address. Additionally, the branch prediction unit stores a predicted branch selector. The predicted branch selector is used to select the branch prediction for forming the subsequent fetch address, and is subsequently verified by comparison to a selected branch selector from the set of branch selectors. The selected branch selector is selected in response to the fetch address. Advantageously, the process of selecting a branch selector from the set is removed from the path of generating a branch prediction. The branch prediction process may be more rapid than would otherwise be achievable, and branch prediction accuracy may be maintained by verifying the predicted branch selector with the selected branch selector.

Numerous variations and modifications will become apparent to those skilled in the art once the above disclosure is fully appreciated. It is intended that the following claims be interpreted to embrace all such variations and modifications.

What is claimed is:

1. A branch prediction unit comprising:

a branch prediction storage coupled to receive a fetch address, wherein said branch prediction storage is configured to select a predicted branch selector stored therein in response to said fetch address; and a selection device configured to select a subsequent fetch address from at least two selectable addresses, said selection device responsive to said predicted branch selector.

2. The branch prediction unit as recited in claim 1 wherein said predicted branch selector is coded to select one of said at least two selectable addresses, and wherein said one of said at least two selectable addresses comprises an address selected during a previous clock cycle in which said fetch address is presented.

3. The branch prediction unit as recited in claim 1 wherein at least a first one of said at least two selectable addresses is derived from a first branch prediction stored in said branch prediction storage, and wherein said first branch prediction is selected in response to said fetch address.

4. The branch prediction unit as recited in claim 3 wherein a second one of said at least two selectable addresses comprises a sequential address.

5. The branch prediction unit as recited in claim 4 wherein said at least two selectable addresses comprises a third address, and wherein said third address is derived from a second branch prediction stored in said branch prediction storage, and wherein said second branch prediction is selected in response to said fetch address.

6. The branch prediction unit as recited in claim 5 wherein said at least two selectable addresses further comprises a fourth address, and wherein said fourth address is a return address corresponding to a return instruction.

7. The branch prediction unit as recited in claim 1 wherein said branch prediction storage is configured to store a plurality of branch selectors corresponding to a group of contiguous instruction bytes corresponding to said fetch address.

8. The branch prediction unit as recited in claim 7 wherein at least one of said plurality of branch selectors is equal to said predicted branch selector.

9. The branch prediction unit as recited in claim 7 further comprising a second selection device configured to select one of said plurality of branch selectors in response to said fetch address.

10. The branch prediction unit as recited in claim 9 further comprising a comparator coupled to receive said one of said plurality of branch selectors and said predicted branch selector, wherein said comparator is configured to compare said one of said plurality of branch selectors to said predicted branch selector.

11. The branch prediction unit as recited in claim 10 further comprising an update unit coupled to said comparator, wherein said update unit is configured to detect a misprediction if said comparator indicates inequality.

12. The branch prediction unit as recited in claim 11 wherein said update unit is configured to update said predicted branch selector within said branch prediction storage to indicate said one of said plurality of branch selectors if said comparator indicates inequality.

13. A method for generating a subsequent fetch address from a fetch address in a microprocessor, comprising:

reading a predicted branch selector from a branch prediction storage responsive to said fetch address;

predicting said subsequent fetch address responsive to said predicted branch selector; and verifying that said predicted branch selector corresponds to said fetch address.

14. The method as recited in claim 13 wherein said verifying comprises selecting one of a plurality of branch selectors from said branch prediction storage, said plurality of branch selectors corresponding to a group of contiguous instruction bytes corresponding to said fetch address.

15. The method as recited in claim 14 wherein said verifying further comprises comparing said one of said plurality of branch selectors to said predicted branch selector.

16. The method as recited in claim 15 further comprising correcting said fetch address if said comparing indicates inequality between said one of said plurality of branch selectors and said predicted branch selector.

17. The method as recited in claim 13 wherein said predicting comprises selecting one of at least two addresses responsive to said predicted branch selector.

18. The method as recited in claim 17 wherein at least one of said at least two addresses is derived from a branch prediction corresponding to said fetch address.

19. The method as recited in claim 18 wherein another one of said at least two addresses is a sequential address.

20. A microprocessor comprising:

an instruction cache configured to select a group of contiguous instruction bytes stored therein responsive to a fetch address; and a branch prediction unit coupled to receive said fetch address, wherein said branch prediction unit is configured to select a predicted branch selector responsive to said fetch address, and wherein said branch prediction unit is configured to generate a subsequent fetch address response to said predicted branch selector, and wherein said branch prediction unit is configured to verify said predicted branch selector by selecting one of a plurality of branch selectors corresponding to said fetch address and comparing said one of said plurality of branch selectors to said predicted branch selector.

21. The microprocessor as recited in claim 20 wherein said predicted branch selector is coded to select one of at least two selectable addresses, and wherein said branch prediction unit is configured to generate said subsequent fetch address by selecting said one of said at least two selectable addresses responsive to said predicted branch selector.

22. The microprocessor as recited in claim 21 wherein at least one of said two selectable addresses is derived from a branch prediction stored by said branch prediction unit.

* * * * *